United States Patent
Cong et al.

(10) Patent No.: US 9,260,616 B2
(45) Date of Patent: Feb. 16, 2016

(54) GLOSS-CONTROLLABLE, RADIATION-CURABLE INKJET INK

(75) Inventors: Lianhui Cong, Concord, NH (US); Daniel Francis Gloster, Meredith, NH (US); Paul Andrew Edwards, Saline, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 783 days.

(21) Appl. No.: 13/408,807

(22) Filed: Feb. 29, 2012

(65) Prior Publication Data

US 2013/0222499 A1 Aug. 29, 2013

(51) Int. Cl.
*C09D 11/101* (2014.01)
*B41J 2/21* (2006.01)
*B41J 2/01* (2006.01)
*C09D 11/322* (2014.01)

(52) U.S. Cl.
CPC .................. *C09D 11/101* (2013.01); *B41J 2/01* (2013.01); *B41J 2/2107* (2013.02); *C09D 11/322* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00

USPC ............. 347/100, 95, 96, 102, 101, 105, 103, 347/21, 20, 9; 106/31.6, 31.13; 523/160, 523/161

See application file for complete search history.

(56) References Cited

U.S. PATENT DOCUMENTS

| | | | |
|---|---|---|---|
| 7,365,105 B2 | 4/2008 | Kiefer-Liptak | |
| 7,429,293 B2 | 9/2008 | Cai | |
| 7,934,785 B2 | 5/2011 | Lang | |
| 2002/0001698 A1 | 1/2002 | Blankenship | |
| 2002/0065335 A1* | 5/2002 | Noguchi et al. | 347/44 |

(Continued)

FOREIGN PATENT DOCUMENTS

| | | | | |
|---|---|---|---|---|
| EP | 1032448 | 9/2000 | | |
| WO | WO-2010150023 | 12/2010 | | |
| WO | WO 2010150023 A2 * | 12/2010 | | B41J 2/01 |

*Primary Examiner* — Manish S Shah
(74) *Attorney, Agent, or Firm* — Michael A. Glenn; Perkins Coie LLP (57) ABSTRACT

Gloss-controllable, radiation-curable inkjet inks cure quickly with minimal radiation exposure, enabling high-printing speed and low surface heating with controllable gloss on the printed image. Ink gloss can be controlled by varying the pinning energy to create the printed images with varied gloss from 10 to 100 gloss unit at 85° gloss measurement angle. After curing, the ink remains flexible on the surface, giving excellent performance on a wide range of surfaces, greatly expanding the range of applications for the ink. A gloss-controllable, radiation-curable inkjet ink may include approximately 8-18% of photo-initiators responding to UVA and UVV (UVA: 320-400 nm wavelengths, UVV: 400-450 nm wavelengths) radiation to initiate free radicals and optionally, other types of photo-initiators and approximately 60-85% of highly flexible mono-functional monomers. The resulting ink is of low viscosity, having excellent flexibility after curing, is low-odor and permits excellent print quality and high productivity on a wide range of surfaces.

20 Claims, 1 Drawing Sheet

(56) References Cited

U.S. PATENT DOCUMENTS

| | | |
|---|---|---|
| 2002/0086914 A1 | 7/2002 | Lee |
| 2005/0146544 A1* | 7/2005 | Kondo .............................. 347/7 |
| 2006/0014852 A1 | 1/2006 | Loccufier |
| 2007/0076069 A1 | 4/2007 | Edwards et al. |
| 2007/0139502 A1* | 6/2007 | Held et al. .................... 347/100 |
| 2007/0259986 A1* | 11/2007 | Elwakil et al. .................. 522/83 |
| 2008/0032037 A1* | 2/2008 | Frey et al. .......................... 427/9 |
| 2008/0050534 A1* | 2/2008 | Louwet et al. ............. 106/31.13 |
| 2008/0111874 A1* | 5/2008 | Gouch .......................... 347/102 |
| 2009/0099277 A1 | 4/2009 | Nagvekar |
| 2009/0252937 A1* | 10/2009 | Zeik et al. .................... 347/105 |

\* cited by examiner

GLOSS-CONTROLLABLE, RADIATION-CURABLE INKJET INK

BACKGROUND

1. Field of the Invention

The invention generally relates to the field of inkjet inks. More particularly, the invention relates to a gloss-controllable, radiation-curable inkjet ink.

2. Discussion of Related Technology

Radiation-curable inks enjoy a number of advantages over water- and solvent-based inks: they are reflected in their "green" or "environmentally friendly" nature and their other well-known advantages including: solvent-free formulation, near-instantaneous cure, improved coating performance, and single-pack system. Furthermore, the inks are cured by radiation after printing, and no extra energy and equipment are required to dry the inks, which meet the growing demand for greater efficiency and cost-effectiveness from the printing industry. For these reasons, their use continues to increase.

Radiation curing is a process whereby organic coatings such as inks are cured or hardened by exposure to electromagnetic radiation such as UV light. Because most radiation-curable inks are thermoset systems, after curing, they typically become hard or rigid as a result of the three-dimensional cross-linking that occurs between molecular chains.

Conventionally, radiation-curable inks include a polymerizable component containing an ethylenically unsaturated radiation-curable group, an initiator component such as a photo-initiator and optionally, a colorant component, such as a pigment, and an additive component.

Radiation-curable inks are generally composed of monomeric and oligomeric materials, pigments, initiators, and additives, and optionally, a small amount of solvent. Radiation-curable inks may be applied to numerous surfaces, both rigid and flexible, e.g. polyvinyl chloride (PVC), polystyrene, polycarbonate, acrylonitrile-butadiene-styrene (ABS), polyester, polyolefins, and textile materials. Ink properties such as adhesion, scratch and rub resistance, flexibility and such are primarily dependent on the properties of the polymerizable components, typically monomers and oligomers having an ethylenically unsaturated group, used in the ink. Most conventional radiation-curable inks have similar physical properties, such as adhesion and scratch resistance.

Conventionally, UV-curable inks use high percentages of poly-functional monomers or oligomers, which provide sufficient cross-linking, to formulate low-dosage UV-curable inks that are capable of rapid drying or curing of the ink dot using a small amount of energy. Because of their propensity to cross-link extensively in all spatial dimensions, such inks cure rapidly, resulting in a relatively rigid cured ink.

Conventionally, while high- and low-gloss inkjet inks are widely known, there are few, if any gloss-controllable radiation-curable inks.

SUMMARY

Gloss-controllable, radiation-curable inkjet inks cure quickly with minimal radiation exposure, enabling high-printing speed and low surface heating with controllable gloss on the printed image. Ink gloss can be controlled by varying the pinning energy to create the printed images with varied gloss from 10 to 100 gloss unit at 85° gloss measurement angle. After curing, the ink remains flexible on the surface, giving excellent performance on a wide range of surfaces, greatly expanding the range of applications for the ink. A gloss-controllable, radiation-curable inkjet ink may include approximately 8-18% of photo-initiators responding to UVA and UVV (UVA: 320-400 nm wavelengths, UVV: 400-450 nm wavelengths) radiation to initiate free radicals and optionally, other types of photo-initiators and approximately 60-85% of highly flexible mono-functional monomers. The resulting ink is of low viscosity, having excellent flexibility after curing, is low-odor and permits excellent print quality and high productivity on a wide range of surfaces.

DETAILED DESCRIPTION

Gloss-controllable, radiation-curable inkjet inks cure quickly with minimal radiation exposure, enabling high-printing speed and low surface heating with controllable gloss on the printed image. Ink gloss can be controlled by varying the pinning energy to create the printed images with varied gloss from 10 to 100 gloss unit at 85° gloss measurement angle. After curing, the ink remains flexible on the surface, giving excellent performance on a wide range of surfaces, greatly expanding the range of applications for the ink. A gloss-controllable, radiation-curable inkjet ink may include approximately 8-18% of photo-initiators responding to UVA and UVV (UVA: 320-400 nm wavelengths, UVV: 400-450 nm wavelengths) radiation to initiate free radicals and optionally, other types of photo-initiators and approximately 60-85% of highly flexible mono-functional monomers. The resulting ink is of low viscosity, having excellent flexibility after curing, is low-odor and permits excellent print quality and high productivity on a wide range of surfaces.

While gloss-controllable solvent-based inks are conventionally known, until now, gloss-controllable, radiation-curable inks have been unknown. As stated herein above in the background discussion, conventional UV-curable inks possess physical properties such as adhesion and scratch resistance. It is important to note that these properties can be achieved and controlled without controlling or modulating the ink drop formation process, particularly the stage of drop spread after the drop impacts the surface. Thus, heretofore, the art has failed to recognize the implications of differences in drop spread between inks or to appreciate the importance of controlling drop spread. Additionally, the art has failed to recognize that the jetted drops of UV-curable inks of different colors actually do not spread at the same rate at a low energy level such as pinning energy.

The gloss-controlled ink compositions herein described are achieved with formulations that result in drops having a uniform spreading rate for each ink color, upon exposure to predetermined amounts of UV radiation at one or more predetermined bandwidths, which permits achievement of a controlled surface topology on the cured ink, resulting in a controllable surface gloss. It has been discovered that skillful selection and combination of photo-initiators, such as photo-initiators responding to UVA and UVV (UVA: 320-400 nm wavelengths, UVV: 400-450 nm wavelengths) radiation, but, in some embodiments, photo-initiators responding to UVB and UVC radiation (UVC: 200-280 nm wavelengths, UVB: 280-320 nm wavelengths) as well, in the ink compositions allows a controllable degree of gloss on the surface of the cured ink. The ink compositions are formulated to reliably form predetermined degrees of gloss not only for the primary colors—cyan, magenta, yellow and black, but also for the combination colors: red, green, blue, four-color black and others.

The inventors in the subject application have discovered that, because each colorant has a unique UV absorption signature, in conventional radiation-curable inks, the cure rate of each ink color is different from that for other colors. This difference in cure rates manifests as variable drop spread across ink colors.

It has also been discovered by the same inventors that, because each colorant has a unique absorbance signature in the UV range, and because each colorant, therefore, competes with the photo-initiator at one or more bandwidths in the UV range specific to the colorant and/or the ink composition containing the colorant in absorbing UV energy, the absorbance signature of the particular colorant itself and/or of an ink composition containing the particular colorant is an important element to consider when tailoring the photo-initiator component to achieve uniform drop spread across inks of different colors when exposed to UV radiation for one of both of pinning and curing. Therefore, by tailoring one or both of the composition and the concentration of the photo-initiator component in an ink composition to the absorbance signature of one or both of the colorant and the resulting ink composition, it is possible to systematically produce inks of different colors in which drop spread is substantially uniform across ink colors.

In embodiments, the composition and concentration of the photo-initiator component is varied according to ink color to control the degree of ink drop spread, resulting in a uniform and predictable gloss in response to exposure to predetermined pinning energies, thus avoiding gloss variation among different portions of an image or among different colors in the printed images and providing gloss-controllable images. The gloss of the printed image can be selected from 10 to 100 gloss unit at, for example, an 85° gloss measurement angle. As above, inks of different color respond differently to the pinning energy, leading to a gloss differential in printed images of more than one color. However, (1) inclusion of photo-initiators responding to UVA and UVV radiation (2) in the proper percentage by weight of the photo-initiator in the ink compositions enables ink dot spreading in similar patterns containing one or both of primary color and combination colors during printing to be controlled in a predictable, repeatable manner. By controlling the spread of the ink dot in this way, the appearance and gloss of the printed images are also controllable.

Some existing, conventional radiation-curable ink compositions are found to have low adhesion, which results in premature peeling or flaking of ink film from the surface. The limited ability of such ink compositions to adhere to a variety of surfaces is increasingly problematic as the demand for using ink on a greater variety of surfaces increases. As above, some ink compositions also show poor flexibility on flexible surfaces, as evidenced by cracking when such surfaces are bent or folded or wrinkled.

Thus, ink compositions formulated with higher functional monomers sacrifice flexibility and adhesion for a fast-drying capability, which significantly limits the application of the ink. There is, therefore a long-felt need for radiation-curable inks that have good adhesion to multiple surfaces and improved flexibility, which renders them capable of withstanding cracking and peeling after being applied to the surface and cured.

Radiation-curable ink compositions generally may be based on formulations which include: a mono-functional monomer component and a photo-initiator component. Additional embodiments may include at least one of an oligomer component, a colorant component and an additive component.

The ink compositions may include a plurality of types of chemical substances. Substances that share a function or property in the ink composition are collectively referred to as a component. As used herein, a functional group refers to compounds having unsaturated carbon-carbon groups that can be polymerized by exposure to radiation during the curing process to form an ink film. Embodiments may be curable by means of exposure to either electromagnetic radiation or thermal radiation.

Because the described ink compositions are curable using no more than a small amount of radiation, they may be considered to be low-dose or fast-curing ink compositions. The fast-cure property of the described ink compositions renders them especially suited for use in high speed printers, the proper function of which is seriously compromised by slower-curing inks.

Conventionally, mono-functional monomers are considered unsuitable for low-dose, fast-curing inks. Because they are able to link only in chains, they tend to cure too slowly to be suited for use in high-speed printers. It has been discovered, however, that skillful selection and combination of mono-functional monomers results in a radiation-curable ink composition of low viscosity that, nonetheless, cures rapidly with a low dose of radiation. The mono-functional monomers selected for a fast-curing radiation-curable ink composition may typically have at least one of the following characteristics: low glass transition temperature, the ability to polymerize readily with low-dose radiation exposure, low viscosity, and the ability to enhance or potentiate at least one predetermined property in at least one of the other members a particular combination. Beyond these general characteristics, efficacious combinations of mono-functional monomers have been empirically determined, as evidenced by Tables 4-8.

Additionally, because monomers do not cross-link in three dimensions during polymerization, the cured inks provide a high degree of flexibility, rendering them suitable for application to a much wider selection of surfaces than ink compositions prepared with higher-functional monomers. The ink compositions thus provide excellent performance on flexible surfaces as well as on rigid surfaces. Because of their versatility, the ink compositions can be applied in arts, such as vehicle graphics, that require the use of flexible surfaces. The described ink compositions are suitable for application to all types of surfaces, including, but not limited to, glass, ceramic, metal, and paper. Embodiments are especially well-suited for application to polymer surfaces. Embodiments are especially well-suited for application to polymer surfaces such as polyolefin, for example COROPLAST (COROPLAST, INC., Dallas, Tex.). Historically, adhesion of radiation-curable inks to polyolefin surfaces has been poor. It has also been discovered that skillful selection and combination of the various components of the ink compositions, particularly an oligomer component, results in ink compositions providing excellent adhesion to a large variety of surfaces including polyolefins.

Fast-curing, radiation-curable inks can substantially reduce surface heating during printing, thereby broadening the application of the radiation-curable ink in inkjet printing to a wide variety of heat-sensitive surfaces. An ultra-violet (UV) lamp is generally used to cure radiation-curable inks. Infrared (IR) light is a by-product of the UV lamp. IR light substantially heats up and wrinkles the surface during printing, affecting the quality of the printed images. More UV output from the UV lamp creates more IR output, and more surface heating. Accordingly, the ink compositions, being low-dose-curable, serve to protect the condition of the surface.

The ink compositions also provide inks of low viscosity, rendering them especially suited for use in inkjet printers.

Mono-Functional Monomer Component

Embodiments may contain approximately 60% to 85% of at least one of a plurality of mono-functional monomers. Examples of suitable mono-functional monomers include, but are not limited to, tetrahydrofurfuryl acrylate, alkoxylated tetrahydrofurfuryl acrylate vinyl caprolatam, isobornyl acrylate, 2-phenoxyethyl acrylate, 2-(2-ethoxyethoxy)ethyl acrylate, isooctyl acrylate, isodecyl acrylate, lauryl acrylate, stearyl acrylate, cyclic trimethylolpropane formal acrylate, 3,3,5-trimethylcyclohexane acrylate, and mono-functional methoxylated PEG (350) acrylate, and so on.

Oligomer Component

Embodiments of the ink compositions may include an oligomer component of approximately 2%-20% by weight. The oligomer component may include at least one of an acrylic oligomer, a urethane (meth)acrylate oligomer, a polyester-based (meth)acrylate oligomer, or a polyether-based (meth)acrylate oligomer, and an epoxy (meth)acrylate oligomer.

An embodiment may include an oligomer component of low viscosity, low volatility, high reactivity, low glass transition temperature, and good adhesion to multiple surfaces in the ink compositions. In an embodiment, the functionality of the oligomer component is not greater than 3. In an embodiment, the functionality of the oligomer component is not greater than 2. The low functionality contributes to more flexible ink compositions. An oligomer component combined with at least one mono-functional monomer component can significantly improve ink adhesion to a wide range of surfaces, including surfaces to which it is difficult for radiation curable inkjet inks to adhere, such as polyolefins.

Examples of suitable acrylic oligomers include, but are not limited to, those under the designations of CN820, CN152, and CN146, etc. from SARTOMER USA, LLC (Exton, Pa.). Examples of suitable urethane (meth)acrylates include, but are not limited to, aliphatic and aromatic urethane (meth) acrylates under the designations of CN991, CN929, CN966, CN981, CN9006, CN9007, CN992, CN994, CN997, CN978, CN1963, etc. from SARTOMER USA, LLC and those from CYTEC SURFACE SPECIALTY, INC., West Paterson, N.J. under the designations of EBECRYL 8402, EBECRYL 1290, and so on.

Examples of suitable polyester or polyether based (meth) acrylate oligomers include, but are not limited to, those under the designations of CN3200, CN 2279, and CN2270, and so on (SARTOMER USA, LLC). Examples of suitable epoxy (meth)acrylate oligomers include, but are not limited to, those under the designations of EBECRYL 3701, EBECRYL 3708, EBECRYL 3200, Ebecryl 3600, etc. from CYTEK SURFACE SPECIALTY, and CN151 (SARTOMER USA, LLC).

Photo-Initiator Component

Embodiments may include a photo-initiator component. In the radiation curing process, the photo-initiator component initiates curing in response to exposure to incident pinning radiation to partially cure the ink, thus controlling spreading of the ink, and controlling gloss of the printed images. Subsequently, the pinned or partially-cured ink is then exposed to a relatively higher dose of radiation than the pinning radiation dosage to cure the ink fully. The amount of photo-initiator responsive to pinning radiation in the photo-initiator component may be 8%-18% by weight per unit volume of ink. The selection of photo-initiators and the selection of a proper percentage by weight per unit volume of ink of UVA and UVV radiation-responsive photo-initiators in the photo-initiator component enable control, during printing, of the spreading of ink drops in similar patterns and in similar degrees for both primary colors and combination colors in the printed image. Thus, the different colors have similar gloss in the printed images after printing. Visually, the printed images may have the same gloss for the whole image, and the gloss is controllable and selectable from 10 to 100 gloss unit at, for example, 85° gloss measurement angle.

Photo-initiators responsive to UVA and UVV (UVA: 320-400 nm wavelengths, UVV: 400-450 nm wavelengths) radiation in the photo-initiator component of the ink compositions are generally activated by exposure to UVA and UVV radiation, thus generating free radicals that contribute to the depth cure in the pinning process. Sufficient depth cure and less surface cure provide good gloss control and good adhesion for printed images. In embodiments, optionally, one or more photo-initiators responsive to UVC and UVB (UVC: 200-280 nm wavelengths, UVB: 280-320 nm wavelengths) radiation energy may be selected to effectively utilize radiation energy, especially using ultra-violet light as radiation.

Examples of suitable photo-initiators responsive to UVA and UVV radiation to initiate free radicals include, but are not limited to, Diphenyl (2,4,6-trimethylbenzoyl) phosphine oxide, bis(2,6-dimethoxy-benzoyl)-2,4,6 trimethyl phenyl phosphine oxide, 3,6-bis(2-methyl-2-morpholino-propionyl)-9-n-octylcarbazole, benzophenone, 4-Phenyl Benzophenone, 2,4,6-trimethylbenzophenone, 2,4,6-triethylbenzophenone, 2,4,6-trimethoxybenzophenone, 2-isopropyl thioxanthone, diethyl thioxanthone, 2-chlorothioxanthone, 2-methylthioxanthone, 2 ethylthioxanthone, 2-tert-butylthioxanthone, 2-phenylthioxanthone, 2-benzylthioxanthone, 2-benzylthioxanthone, 4-isopropylthioxanthone, etc. Suitable blends of photo-initiators commercially available include, but are not limited to, those under the designations of DAROCUR 4265, IRGACURE 2022, IRGACURE 2100 (CIBA SPECIALTY CHEMICALS, Basel, CH); and ESACURE KT37, ESACURE KT55, ESACURE KTO046, (LAMBERTI, S.p.A, Gallarate, IT).

Examples of suitable photo-initiators responsive to UVC and UVB radiation initiate free radicals include, but are not limited to, 1-hydroxycyclohexylphenyl ketone, 4-isopropylphenyl-2-hydroxy-2-methyl propan-1-one, 1-[4-(2-hydroxyethoxy)-phenyl]-2-hydroxy-2-methyl-1-propan-1-one, 2,2-dimethyl-2-hydroxy-acetophenone, 2,2-dimethoxy-2-phenylacetophenone, 2-hydroxy-2-methylpropionphenone, 2-methyl-1-1[4-(methylthio)phenyl]-2-morpholino-propan-1-one, 2-benzyl-2-(dimethylamino)-1-(4-morpholinyl)phenyl)-1-butanone, benzophenone, 4-Phenyl Benzophenone, 2,4,6-trimethylbenzophenone, isopropyl thioxanthone, diethyl thioxanthone. Suitable blends of photo-initiators commercially available include, but are not limited to, those under the designations of DAROCUR 4265, (CIBA SPECIALTY CHEMICALS, Basel, CH); and ESACURE KT37, ESACURE KT55, ESACURE KTO046, and ESACURE One (LAMBERTI, S.p.A, Gallarate, IT).

The photo-initiator component can further comprise a co-initiator. In an embodiment, the amount of co-initiator component may be 0-10% by weight of the ink compositions. In a further embodiment, the amount of co-initiator component may be 0-5% by weight of the ink compositions. In a still further embodiment, the amount of co-initiator component may be preferably 2-5% by weight of the ink compositions. The co-initiator component is used to activate photo-initiators to initiate polymerization or is used to improve the surface curing of ink by mitigating oxygen inhibition of free radicals generated by photo-initiators. Examples of suitable co-initiators include, but are not limited to, those under the designations of CN386, CN384, and CN383 from SARTOMER USA, LLC (Exton, Pa.); and EBECRYL 7100 from CYTEC SURFACE SPECIALTIES, INC. (Smyrna Ga.).

Additive Component

Embodiments may further include one or more additive components. Various additives may be included in the ink compositions, including one or more of a surfactant, a leveling additive, a stabilizer, and so on.

In an embodiment, a surfactant may be used to reduce the surface tension of the ink compositions, improving wetting property of the inks on surfaces. The amount of surfactant in the ink compositions may be 0.01-2% by weight. In an embodiment, the amount of surfactant may be 0.05-0.5% by weight. In an embodiment, the surfactant may constitute at least one polysiloxane acrylate, also known as a silicone acrylate, which participates in the radiation curing process to be part of the cured ink. Examples of a suitable surfactant may include, but are not limited to, those under the designations of TEGORAD 2200N, TEGORAD 2100, and TEGORAD 2300 from GOLDSCHMIDT CHEMICAL CORPORATION (Hopewell, Va.); and BYK 307, BYK 330, BYK 377 and BYK 3510 (BYK CHEMIE GMBH (Wesel, FRG).

In an embodiment, a leveling additive may be used to improve the flowing property of ink to produce a more uniform surface of ink film. The amount of leveling agent in the compositions may be 0.1-2% by weight. Examples of suitable leveling agents include, but are not limited to, those under the designation of BYK 361N, BYK 353, and BYK 354 and so on. (BYK CHEMIE GMBH).

In an embodiment, a stabilizer may be used to improve shelf life and photolytic stability of ink compositions. Stabilizers in the ink compositions may include at least one ultra-violet light stabilizer, at least one free radical scavenger stabilizer, and so on. Examples of ultra-violet light stabilizers include ultra-violet absorber stabilizer and hindered amine light stabilizer. These stabilizers are used to improve the outdoor durability and weatherability of cured ink. Commercially available ultra-violet light stabilizers include, but are not limited to, those having designations of: TINUVIN 460, TINUVIN 479, TINUVIN 171, TINUVIN 928, TINUVIN 123, and TINUVIN 292 from CIBA SPECIALTY CHEMICALS CORP (BASF AG, Ludwigshafen, FRG). One or more UV inhibitor/stabilizers may be present in the ink compositions in amounts of 0.01%-2% by weight, and more specifically 0.1%-1% by weight.

A free radical-scavenger stabilizer is used to improve the stability of ink against heat. Examples of a free radical scavenger include, but are not limited to, hydroquinone, 4-methoxyphenol, hindered phenol such as UV22 from CIBA SPECIALTY CHEMICALS CORP (BASF AG, Ludwigshafen, FRG), ST-1 (Tris(N-Nitroso-N-Phenyl-Hydroxylamine)-Aluminum Salt+92% 2-Phenoxyethyl Acrylate) (ZX-CHEMTECH, Traverse City, Mich.), and so on. The amount of free radial scavenger stabilizer can be present in ink compositions in 0.05-1% by weight, and more specifically 0.1-0.5% by weight. A small amount may be used in the ink compositions to minimize free-radical interference with the radiation curing process.

Colorant Component

The ink compositions further comprise a colorant component if color is desired. The colorant can be pigment, dyes, or a combination of pigments and/or dyes. The amount of colorant component in the ink compositions may be in the range of 0-20% by, more preferably 0-8% by weight. A clear coating, for example, may have 0% colorant.

Examples of suitable pigments include, but are not limited to, those under the designation of Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, and Pigment Blue 60; Pigment Brown 5, Pigment Brown 23, and Pigment Brown 25; Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 120, Pigment Yellow 128, Pigment Yellow 129, Pigment Yellow 138, Pigment Yellow 139, Pigment Yellow 150, Pigment Yellow 154, Pigment Yellow 156, and Pigment Yellow 175; Pigment Green 1, Pigment Green 7, Pigment Green 10, and Pigment Green 36; Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, and Pigment Orange 61; Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, and Pigment Red 224; Pigment Violet 19, Pigment Violet 23, Pigment Violet 37, Pigment Violet 32, Pigment Violet 42; and Pigment Black 6 or 7 (The Colour Index, Vols. 1-8, by the Society of Dyers and Colourists, Yorkshire, England), Black PB 2 and 5; carbon black; titanium dioxide (including rutile and anatase); zinc sulfide, and the like or a mixture thereof.

If pigment is used in the ink compositions, in an embodiment, the pigment is pre-dispersed prior to incorporation, generally into one or more of the monomer and/or oligomer components used in the ink compositions. In embodiments, the colorant is added as a pigment slurry prepared with a portion of a reactive diluent such as propoxylated 2-neopentyl glycol diacrylate (SR-9003, SARTOMER USA, LLC), isobornyl acrylate etc. Dispersion agents generally may be used to improve the stability of dispersion by reducing or avoiding the possibility of pigment particle settling or agglomeration. Examples of suitable dispersion agents may include, but are not limited to, those under the designations of SOLSPERSE 32000 from LUBRIZOL ADVANCED MATERIALS (Wickliffe, Ohio); DISPERBYK 111 and DISPERBYK 180 from BYK-CHEMIE GMBH (Wesel, FRG). The pigment in the dispersion may be 20-80% by weight. Other additives such as stabilizers, flowing additives, and such may be incorporated during the dispersion process to improve the stability of dispersion.

The ink compositions are of a low viscosity suitable for inkjet printing. In an embodiment, ink viscosity is not greater than 40 cP (centipoise) at 25° C. In a further embodiment, ink viscosity is not greater than 30 cP at 25° C.

Pinning Energy

The ink compositions are pinned and cured by UV radiation to give gloss-controllable printed images. In an embodiment, the ratio of the amount of the total pinning energy by the unit of $mJ/cm^2$ to the percentage of the photo-initiators responding to UVA and UVV radiation in the ink compositions may be 0-100. In an embodiment, the ratio may be 0-50.

Fabrication

The ink compositions are fabricated by blending the various components in predetermined proportions at approximately room temperature, or an ambient temperature range of approximately 20-25° C.

Application

The ink compositions can be printed on an ink jet printer. In an embodiment, the ink jet printer includes a component for radiation curing of the ink. In a further embodiment, the radiation curing component is a separate assembly having pinning and curing radiation sources. In an embodiment, the pinning and curing radiation can be generated by separate sources or a single source having gradient intensity or dosage to service both pinning and curing functions. Non-limiting examples of suitable radiation sources include high-pressure or low-pressure mercury vapor lamps, with or without doping, UV-LED, or electron beam sources. Their arrangement is known in principle and may be adapted to the circumstances of the surface for printing and the process parameters.

EXAMPLES

The described ink compositions result in rapid-curing, low-dose UV-curable inks requiring a total UV energy (UV-A+UV-B+UV-C) for curing by means of Mercury Arc H bulbs of approximately 120 mJ/cm$^2$ for the color pattern formed under printing conditions of 600×3600 DPI and 30 pcl dot size.

Curing testing was conducted on a pressure-sensitive-adhesive (PSA) vinyl substrate, DPF2000 produced by ARLON GRAPHICS, LLC (Santa Ana, Calif.). An ink film was prepared under printing conditions of 600×3600 DPI and 30 pcl dot size. The ink film was then cured using a medium-pressure mercury vapor lamp.

Gloss Control

Figure 1:
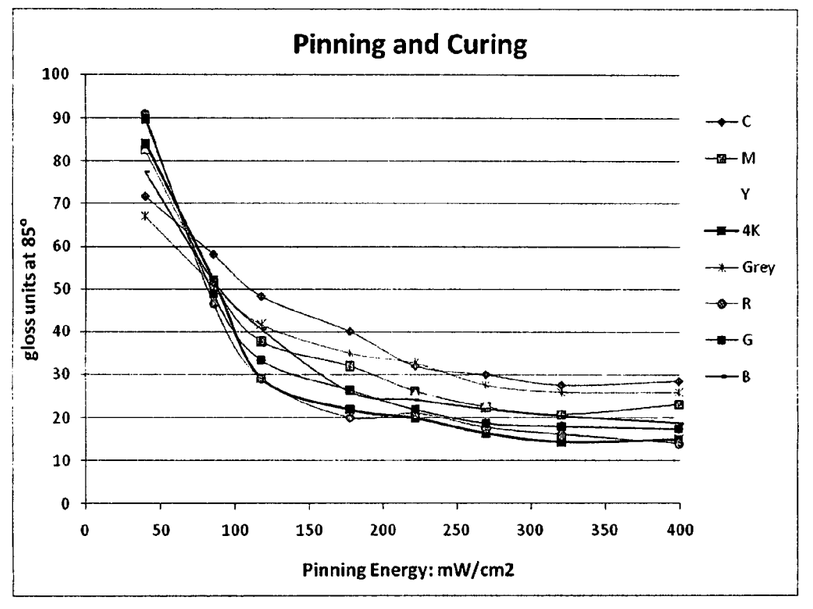
FIG. 1 provides a graph of gloss levels vs. a range of pinning energy values.

The ink compositions are formulated to respond characteristically to differing amounts of UV energy. The ink gloss can be controlled by varying the pinning energy to produce printed images having varied gloss from 10 to 100 gloss unit at 85° gloss measure angle for both primary colors, such as cyan, magenta, yellow and black, and combination colors such as red, green, blue, four-color black, and others. As shown by the data in Table 1, the gloss control for primary color and combination colors is very similar because the response to the selected pinning energy is approximately the same across all colors. The gloss of all colors in the printed images is at a similar level, thus yielding images having consistent gloss. Furthermore, the table of FIG. 1 shows that lower pinning energy values resulted in higher gloss levels than higher pinning energy values. As shown, the highest level of gloss was achieved at a pinning energy of approximately 50 mJ/cm$^2$ while minimal gloss was achieved at a pinning energy greater than approximately 50 mJ/cm$^2$.

Elongation was measured using a tensile tester from COM-TEN INDUSTRIES, INC. (Pinellas Park, Fla.), Model: 95 Series. The ink sample was cut into strips of 1 inch width, and placed in the two clamps of the tester, which were set 2 inches apart. The speed crosshead is 12 inches/min, and the test was stopped when the sample broke. Elongation was measured at the point when the test stopped. In some embodiments, elongation was measured at 180%. Exemplary elongation data are shown in Table 1, below.

TABLE 1

| Print Conditions: | Color/Sample | High Gloss Mode TO BREAK % | Medium Gloss Mode TO BREAK % | Low Gloss Mode TO BREAK % |
|---|---|---|---|---|
| 600 × 360 dpi, 30 pcl dot size | Cyan | 158.05 | 143.6 | 146.25 |
| | Magenta | 140.45 | 121.05 | 118.4 |
| | Yellow | 154.4 | 147.1 | 140.4 |
| | Black | 116.95 | 134.7 | 132.85 |
| | Red | 111.4 | 109 | 109.55 |
| | Green | 123.75 | 118.55 | 118 |
| | Blue | 121.4 | 115.6 | 116 |
| | 4c Black | 122.05 | 145.6 | 129.7 |

An adhesion measurement was based on ASTM standard D 3359, covering test methods for assessing adhesion of coating films to various surfaces, such as metal and plastic, by applying and removing pressure-sensitive tape over "X" cuts made in the film, which standard is hereby incorporated herein. The test was conducted by cutting a cross-hatch pattern on the ink sample and applying a suitable tape, such as PERMACEL 99 adhesion test tape from PERMACEL, INC. (Pleasant Prairie, Wis.) over the crosshatch area. The tape was rubbed firmly to remove any trapped air bubbles to ensure full contact, and the tape was then rapidly pulled off at an angle approaching 180°. The crosshatch area was evaluated based on ASTM D 3359 method B. The results of the adhesion testing on a variety of surfaces are summarized in the table below. According to the ASTM standard, on a scale of 0-5, with 0 indicating no adhesion and 5 indicating best adhesion with no flaking occurring after application of the tape, the ink composition demonstrated excellent adhesion on a variety of surfaces.

TABLE 2

| | | High gloss | | Medium Gloss | | Low gloss | |
|---|---|---|---|---|---|---|---|
| | Substrate | 1 hr | 24 hr | 1 hr | 24 hr | 1 hr | 24 hr |
| Cross-hatch (ASTM) | 3M 18010 | 5.0 | 5.0 | 5.0 | 5.0 | 5.0 | 5.0 |
| | Arlon DPF2000 | 5.0 | 5.0 | 5.0 | 5.0 | 5.0 | 5.0 |
| | PETG | 4.9 | 4.9 | 4.8 | 4.4 | 5.0 | 5.0 |
| | LEXAN | 5.0 | 5.0 | 4.3 | 4.8 | 4.6 | 4.6 |
| | Di-Bond | 5.0 | 5.0 | 4.9 | 5.0 | 5.0 | 5.0 |
| | Styrene | 5.0 | 5.0 | 5.0 | 5.0 | 5.0 | 5.0 |

A number of exemplary embodiments are described in Tables 3-7, herein below. The exemplary embodiments are provided only for descriptive purposes and do not limit the scope of the ink compositions.

Table 3 shows formulations for four primary inkjet ink compositions each formulation including (1) an oligomer component; (2) a monomer component; (3) an additive component; (4) a photo-initiator component; and (5) a pigment component according to one embodiment. In this example, the ink composition exhibits a viscosity of less than 10-12 cP at 40° C., a fast-curing property, typified by a radiation dose of approximately 120-140 mj/cm$^2$ to fully cure the inks, and good flexibility with elongation of 100-163%.

As shown in table 3, the oligomer component comprises an aliphatic polyester-based urethane diacrylate oligomer such as CN991 (SARTOMER). The monomer component consists of a tetrahydrofurfuryl acrylate such as SR285 (SARTOMER), an isobornyl acrylate (IBOA), and a Vinylcaprolactam. The photo-initiator component comprises a diphenyl (2,4,6-trimethylbenzoyl) phosphine oxide, such as GENOCURE TPO (RHAN USA CORP., Aurora, Ill.), IRGACURE 369 and a ESACURE ONE (LAMBERTI). The additive component comprises a leveling additive, such as BYK361N (BYK CHEMIE), a surfactant, such as BYK377 made by (BYK CHEMIE), and a stabilizer, such as ST-1 (ALBEMARLE CORP., Baton Rouge, La.).

In this example, a pre-dispersed pigment slurry was combined with the other ingredients to produce the ink composition. It will be appreciated, however, that the ink composition can be created with dry pigment as well.

TABLE 3

| MATERIALS | INK COMPOSITION | | | |
|---|---|---|---|---|
| Chemical Name | Cyan | Magenta | Yellow | Black |
| Pigment | 2.00 | 2.90 | 2.0 | 3.00 |
| Propoxylated (2) Neopentyl glycol Diacrylate | 7.00 | 11.00 | 11.5 | 9.50 |
| Urethane Acrylate | 11.30 | 7.00 | 10.00 | 9.80 |
| Tetrahydrofurfuryl Acrylate | 18.00 | 18.00 | 20.35 | 28.55 |
| Vinylcaprolactam | 33.00 | 32.75 | 0.00 | 30.35 |
| Isobornyl Acrylate | 0.00 | 0.00 | 20.00 | 0.00 |
| CTFA | 15.35 | 15.00 | 23.00 | 15.00 |
| Stabilizer | 0.30 | 0.30 | 0.30 | 0.30 |
| Polyacrylate Leveling agent | 0.50 | 0.50 | 0.50 | 0.50 |
| Polyether Modified Polydimethyl Siloxane | 0.05 | 0.05 | 0.05 | 0.05 |
| TPO | 8.00 | 8.00 | 8.00 | 9.00 |
| Irgacure 369 | 0.50 | 0.50 | 0.00 | 0.50 |
| Esacure One | 4.00 | 4.00 | 4.00 | 4.00 |
| Viscosity @45 C. | 10.9 CPs | 10.8 CPs | 12.6 CPs | 11.5 CPs |

The examples in Tables 4-7 describe color inks generally used in inkjet printing. The ink gloss is controllable and the inks adhere to a broad range of surfaces. In particular, the ink compositions strongly adhere to polyolefins, such as COROPLAST (COROPLAST, INC., Dallas, Tex.), PVC (polyvinyl chloride), polycarbonates, polyesters, polystyrenes, ABS (acrylonitrile butadiene styrene) and textile materials, and so on.

TABLE 4

| MATERIALS | INK COMPOSITION | | | |
|---|---|---|---|---|
| Chemical Name | Cyan | Magenta | Yellow | Black |
| Pigment | 2.00 | 2.90 | 3.0 | 3.00 |
| Propoxylated (2) Neopentyl glycol Diacrylate | 4.00 | 10.20 | 7.30 | 9.00 |
| Acrylic Oligomer | 7.80 | 5.00 | 6.80 | 7.30 |
| Tetrahydrofurfuryl Acrylate | 24.00 | 22.50 | 23.00 | 22.00 |
| Isobornyl Acrylate | 26.45 | 25.35 | 22.65 | 25.65 |
| CTFA | 23.70 | 22.00 | 25.70 | 20.50 |
| Stabilizer | 0.10 | 0.10 | 0.10 | 0.10 |
| Polyacrylate Leveling Agent | 0.50 | 0.50 | 0.50 | 0.50 |
| Polyether Modified Polydimethyl Siloxane | 0.05 | 0.05 | 0.05 | 0.05 |
| TPO | 4.90 | 4.90 | 4.90 | 4.90 |
| Irgacure 819 | 4.50 | 4.50 | 4.00 | 5.00 |
| α-Hydroxy Ketone | 2.00 | 2.00 | 2.00 | 2.00 |
| Viscosity @45 C. | 10.2 CPs | 11.1 CPs | 10.9 CPs | 10.9 CPs |

TABLE 5

| MATERIALS | INK COMPOSITION | | | |
|---|---|---|---|---|
| Chemical Name | Cyan | Magenta | Yellow | Black |
| Pigment | 2.00 | 2.90 | 3.0 | 2.50 |
| Propoxylated (2) Neopentyl glycol Diacrylate | 4.00 | 10.20 | 7.30 | 8.00 |
| Acrylic Oligomer | 9.00 | 6.00 | 7.50 | 9.20 |
| Tetrahydrofurfuryl Acrylate | 25.00 | 25.50 | 25.00 | 25.00 |
| Isobornyl Acrylate | 26.20 | 23.30 | 21.60 | 24.20 |
| CTFA | 23.20 | 21.50 | 25.50 | 20.00 |
| Stabilizer | 0.10 | 0.10 | 0.10 | 0.10 |
| Polyacrylate Leveling agent | 0.50 | 0.50 | 0.50 | 0.50 |
| Polyether Modified Polydimethyl Siloxane | 0.05 | 0.05 | 0.05 | 0.05 |
| TPO | 4.95 | 4.95 | 4.95 | 4.95 |
| Irgacure 819 | 3.00 | 3.00 | 4.00 | 5.00 |
| Irgacure 379 | 0.50 | 0.50 | 0.50 | 0.50 |
| Esacure One | 1.50 | 1.50 | 1.50 | 1.50 |
| Viscosity @45 C. | 10.2 CPs | 11.1 CPs | 10.9 CPs | 10.9 CPs |

TABLE 6

| MATERIALS | INK COMPOSITION | | | |
|---|---|---|---|---|
| Chemical Name | Cyan | Magenta | Yellow | Black |
| Pigment | 1.80 | 2.90 | 2.82 | 2.50 |
| Propoxylated (2) Neopentyl glycol Diacrylate | 3.24 | 10.10 | 4.86 | 6.58 |
| Acrylic Oligomer | 9.00 | 5.50 | 8.50 | 11.00 |
| Tetrahydrofurfuryl Acrylate | 25.00 | 25.60 | 30.57 | 30.00 |
| Isobornyl Acrylate | 27.16 | 23.30 | 23.00 | 21.82 |
| CTFA | 22.70 | 21.50 | 17.65 | 15.00 |
| Stabilizer | 0.10 | 0.10 | 0.10 | 0.10 |
| Polyacrylate Leveling agent | 0.50 | 0.50 | 0.50 | 0.50 |
| Polyether Modified Polydimethyl Siloxane | 0.05 | 0.05 | 0.05 | 0.05 |
| TPO | 4.95 | 4.95 | 4.95 | 4.95 |
| Irgacure 819 | 3.50 | 3.50 | 4.00 | 5.00 |
| Irgacure 369 | 0.50 | 0.00 | 0.00 | 0.00 |
| DETX | 0.00 | 0.00 | 2.00 | 2.50 |
| Esacure One | 1.50 | 2.00 | 1.00 | 0.00 |
| Viscosity @45 C. | 12.2 CPs | 14.4 CPs | 12.4 CPs | 13.3 CPs |

TABLE 7

| MATERIALS | INK COMPOSITION | | | |
|---|---|---|---|---|
| Chemical Name | Cyan | Magenta | Yellow | Black |
| Pigment | 0.4 | 0.6 | 0.56 | 0.45 |
| Propoxylated (2) Neopentyl glycol Diacrylate | 0.72 | 2.54 | 0.94 | 1.31 |
| Acrylic Oligomer | 12 | 11.5 | 11.00 | 11.50 |
| Tetrahydrofurfuryl Acrylate | 29.00 | 30.00 | 29.00 | 29.64 |
| Isobornyl Acrylate | 30.28 | 28.26 | 30.40 | 29.00 |
| CTFA | 18.00 | 17.50 | 18.00 | 17.50 |
| Stabilizer | 0.10 | 0.10 | 0.10 | 0.10 |
| Polyacrylate Leveling agent | 0.50 | 0.50 | 0.50 | 0.50 |
| Polyether Modified Polydimethyl Siloxane | 0.05 | 0.05 | 0.05 | 0.05 |
| TPO | 4.95 | 4.95 | 4.95 | 4.95 |
| Irgacure 819 | 3.50 | 3.50 | 3.50 | 4.00 |
| Irgacure 369 | 0.50 | 0.00 | 0.00 | 0.00 |

TABLE 7-continued

| MATERIALS | INK COMPOSITION | | | |
|---|---|---|---|---|
| Chemical Name | Cyan | Magenta | Yellow | Black |
| Esacure One | 1.0 | 1.00 | 1.00 | 1.00 |
| Viscosity @45 C. | 11.4 CPs | 12.1 CPs | 11.3 CPs | 10.9 CPs |

As will be understood by those familiar with the art, the ink compositions may be embodied in other specific forms without departing from the spirit or essential characteristics thereof. Likewise, the particular naming and division of the members, features, attributes, and other aspects are not mandatory or significant, and the mechanisms that implement the various embodiments or their features may have different names, divisions and/or formats. Accordingly, the present disclosure is intended to be illustrative, but not limiting, of the scope of the ink compositions, which scope is set forth in the following Claims.

The invention claimed is:

1. An ink composition comprising:
   a colorant component;
   a photo-initiator component, wherein the photo-initiator component has a predetermined composition and concentration, wherein any of the composition and the concentration of the photo-initiator in the ink composition is chosen based on the absorbance signature of one or both of the colorant component and the resulting ink composition, to produce inks of different colors in which drop spread is substantially uniform across ink colors, to result in:
      predetermined pinning and cure rates of said ink composition upon exposure of said ink composition to UV radiation; and
      a predetermined degree of gloss on a cured surface of said ink composition; and
   a flexible mono-functional monomer component present in said ink composition in an amount of 60-85 percent by weight of said ink composition;
   wherein said ink composition is configured to remain flexible after UV curing.

2. The ink composition of claim 1, wherein said photo-initiator component comprises at least 8 percent and no more than 18 percent by weight of said ink composition.

3. The ink composition of claim 1, wherein said photo-initiator component comprises no more than 15 percent by weight of said ink composition.

4. The ink composition of claim 1, wherein said photo-initiator component comprises at least one photo-initiator selected from a group comprising at least one of photo-initiators responsive to UV-A radiation and photo-initiators responsive to UV-V radiation.

5. The ink composition of claim 1, wherein said exposure to UV radiation comprises exposure to at least one of UV-A and UV-V radiation.

6. The ink composition of claim 1, wherein said photo-initiator component comprises at least one of:
   Diphenyl (2,4,6-trimethylbenzoyl)phosphine oxide;
   bis(2,6-dimethoxy-benzoyl)-2,4,6 trimethyl phenyl phosphine oxide;
   2-methyl-1-1[4-(methylthio)phenyl]-2-morpholino-propan-1-one;
   3,6-bis(2-methyl-2-morpholino-propionyl)-9-n-octylcarbazole;
   benzophenone;
   4-Phenyl Benzophenone;
   2,4,6-triethylbenzophenone;
   2,4,6-trimethoxybenzophenone;
   2,4,6-trimethylbenzophenone;
   2-isopropyl thioxanthone;
   2-Chlorothioxanthone;
   2-methylthioxanthone;
   2 ethylthioxanthone;
   2-tert-butylthioxanthone;
   2-phenylthioxanthone;
   2-benzylthioxanthone;
   2-benzylthioxanthone; and
   4-isopropylthioxanthone.

7. The ink composition of claim 1, wherein said flexible mono-functional monomer component comprises at least one of:
   isobornyl acrylate;
   cyclic trimethylpropane formal acrylate;
   tetrahydrofurfuryl acrylate;
   2-phenoxyethyl acrylate;
   N-vinylcaprolactam;
   alkoxylated tetrahydrofurfuryl acrylate;
   isooctyl acrylate; and
   CD420 (SARTOMER USA, LLC).

8. The ink composition of claim 1, further comprising:
   an oligomer component.

9. The ink composition of claim 8, wherein said oligomer component comprises 2-20 percent by weight of said ink composition.

10. The ink composition of claim 8, wherein said oligomer component comprises at least one of:
    one or more acrylic oligomers;
    one or more polyester urethane acrylates;
    one or more polyester-based acrylates; and
    one or more polyether-based acrylates.

11. The ink composition of claim 1, wherein said colorant component is present in said ink composition in an amount of greater than 0 percent but less than or equal to 20 percent of said ink composition by weight.

12. The ink composition of claim 1, wherein exposure of said ink composition to UV radiation comprises one of both of:
    exposure to a pinning energy at a rate of approximately 50-400 mW/cm$^2$; and
    exposure to a total amount of energy sufficient to fully cure the ink composition;
    wherein said UV radiation comprises at least one of UV-A and UV-V radiation.

13. The ink composition of claim 1, wherein the ink viscosity is not greater than 20 CPs (centipoise) at 45° Celsius.

14. The ink composition of claim 1, further comprising an additive component.

15. The ink composition of claim 14, wherein said additive component comprises 0.01-2 percent by weight of said ink composition.

16. The ink composition of claim 1, wherein one or both of pinning and curing by exposure to a predetermined amount of UV radiation under predetermined printing conditions produces a predetermined degree of gloss on a surface of said ink composition.

17. The ink composition of claim 16, wherein said predetermined degree of gloss is in a range of approximately 10-100 gloss units at a measurement angle of 85°.

18. A method of manufacturing an ink composition comprising:
mixing at an ambient temperature of approximately 20-25° C. a combination comprising:
a colorant component;
a photo-initiator component, wherein the photo-initiator component has a predetermined composition and concentration, wherein any of the composition and the concentration of the photo-initiator in the ink composition is chosen based on the absorbance signature of one or both of the colorant component and the resulting ink composition, to produce inks of different colors in which drop spread is substantially uniform across ink colors, to result in:
predetermined pinning and cure rates of said ink composition upon exposure of said ink composition to at least one of UVA and UVV radiation; and
a predetermined degree of gloss on a cured surface of said ink composition;
in an amount of approximately 60 to approximately 85 percent by weight of said ink composition, a flexible mono-functional monomer component; and
in an amount of approximately 2% to 20% by weight of said ink composition, an oligomer component;
wherein said ink composition is configured to remain flexible upon UV curing.

19. The method of claim 18, wherein said colorant component comprises an amount greater than 0 percent but less than or equal to 20 percent by weight of said ink composition.

20. The method of claim 18, said combination further comprising:
in an amount of approximately 0.01 percent to 2.0 percent by weight, an additive component.

* * * * *